J. DAVIES.
Churn.
No. 66,469.
Patented July 9, 1867.
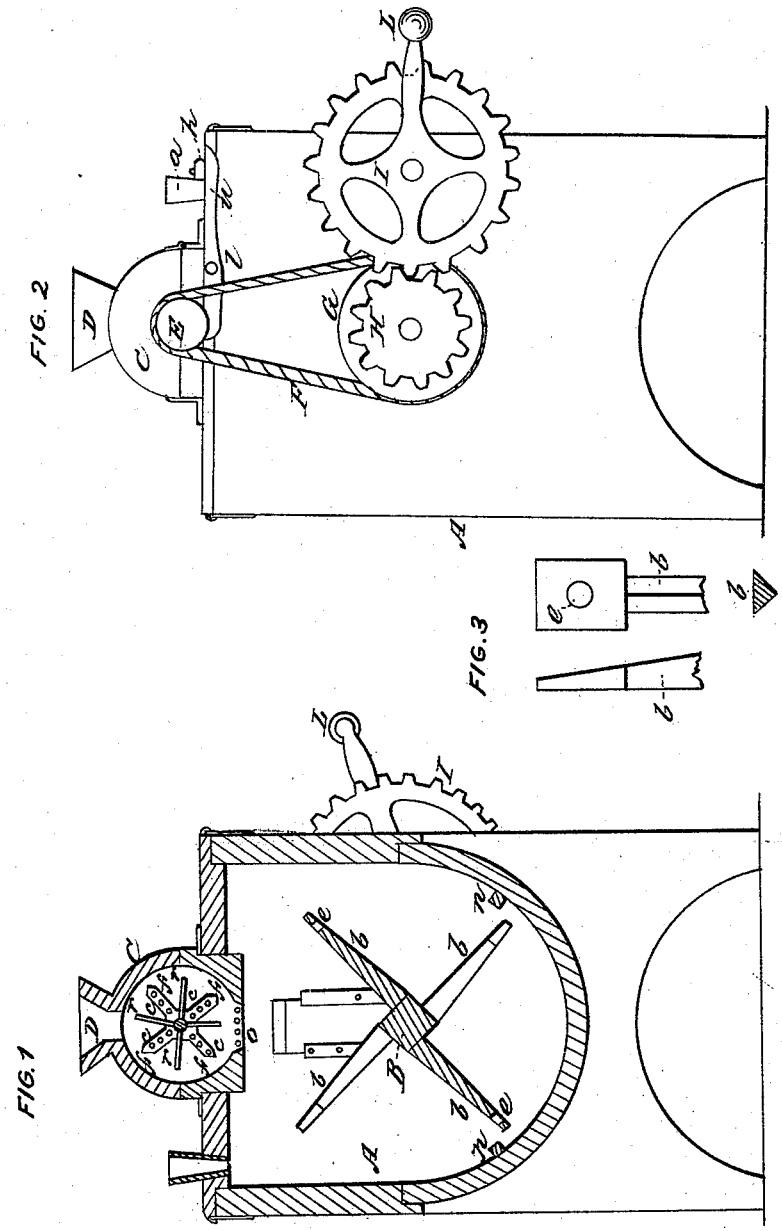
WITNESSES:
INVENTOR:

United States Patent Office.

JAMES DAVIES, OF MAZOMANIA, WISCONSIN.

Letters Patent No. 66,469, dated July 9, 1867.

---

IMPROVEMENT IN CHURNS.

---

*The Schedule referred to in these Letters Patent and making part of the same.*

---

TO ALL WHOM IT MAY CONCERN:

Be it known that I, JAMES DAVIES, of Mazomania, in the county of Dane, and State of Wisconsin, have invented certain new and useful improvements in Churns; and I do hereby declare that the following is a full, clear, and exact description thereof, reference being had to the accompanying drawings making part of this specification, and to the letters of reference marked thereon, like letters indicating like parts wherever they occur.

To enable others skilled in the art to construct and use my invention, I will proceed to describe it.

My invention consists in a novel arrangement of devices for breaking up the globules or sacs containing the particles of butter, and then gathering the same into a mass.

Figure 1 is a transverse vertical section.

Figure 2 is an end elevation.

I construct the body of my churn in the form of an oblong box, with a curved bottom, the end pieces forming the feet also for supporting it. To this I apply a hinged cover; and on this cover I locate a similar box or hopper, C, with a funnel-shaped opening at its top, and having an opening at the bottom, connecting it with the interior of the churn, as shown in fig. 1. Longitudinally across this opening I arrange a series of parallel wires $o$, forming a grating. The interior of this upper box C is made circular in form, as shown in fig. 1, and in its interior I place a flutter-wheel, consisting of a shaft with four radial arms $f$, between which I extend a series of wires or small rods, $c$, parallel with the shaft, as shown in fig. 1. I also provide the shaft of the flutter-wheel with a series of radial wires or rods, $r$, as shown, thus forming a wheel, which, when rapidly revolved, will break up the globules in a most efficient manner. Within the body of the churn I place a shaft, B, to which is attached a series of radial arms, $b$, having their outer ends provided with an enlarged flat head with a hole, $e$, in its centre; the body of the arms $b$ being bevelled, as represented in Figure 3, on one side. To the end of the shaft B, outside of the churn, a pulley, G, is attached, and also a pinion, H, into which latter a wheel, I, gears; this wheel I being provided with a crank, L, for imparting motion. From the pulley G a cord extends up, and passes around a small pulley, E, attached to the end of the shaft of the flutter-wheel. The shaft of the flutter-wheel, at the end where the pulley E is attached, has its bearing on a lever, $u$, pivoted at $z$ to the end of the box, as shown in fig. 2. A button, $h$, is so arranged as to shut over the outer end of this lever $u$, and by thus keeping its outer end depressed, raise the opposite end and keep the cord F taut. When thus arranged, by turning the crank L, both wheels or dashers will be revolved; that in the box or compartment C being rotated very rapidly. Whenever the button $h$ is turned so as to release the outer end of the lever $u$, its inner end will be depressed, by which means the cord F will be loosened so as to permit the flutter-wheel to remain stationary, while the dasher in the lower box continues to rotate. The box C is divided longitudinally through its centre, and provided with hinges on one side, so that it may be opened for removing the wheel whenever desired, for cleaning or other purposes.

The operation is as follows: The cream or milk is poured through the hopper or funnel D, on to the flutter-wheel, which instantly beats and breaks up the globules or sacs, thereby liberating the particles of butter, which with the buttermilk falls into the box below, where the arms $b$ of the dasher soon gather the particles into a mass, separating the butter from the milk. As soon as the cream has all passed through the upper box, the lever is released, and the flutter-wheel stopped, while the dasher is continued in motion as long as may be necessary to gather the butter. By these means I secure all the butter in an exceedingly brief period of time.

Having thus described my invention, what I claim, is—

1. The flutter-wheel, constructed as described, and arranged in the box C, on top of the main churn, with the grated opening at its bottom, as set forth.

2. The pivoted lever $u$, arranged to form the outer bearing for the shaft of the flutter-wheel, so that by releasing said lever the band may be loosened and the wheel stopped, independent of the main dasher, as described.

3. In combination with the ribs $n$, secured to the inner wall of the churn, I claim the revolving dasher B, having its arms constructed of triangular bars $b$, with the rectangular perforated enlargement at their outer ends, as described.

JAMES DAVIES.

Witnesses:
JAMES PRITCHARD,
E. WOOD CORNES.